Oct. 7, 1969    O. H. HILLANDER    3,471,206
SHAFT BEARINGS FOR COUNTERROTATING PROPELLER SHAFTS
Filed Oct. 25, 1967
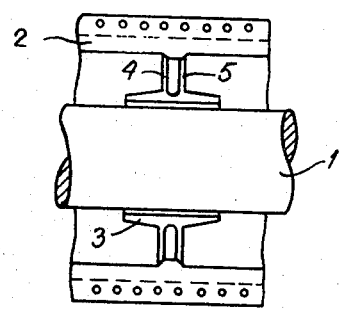
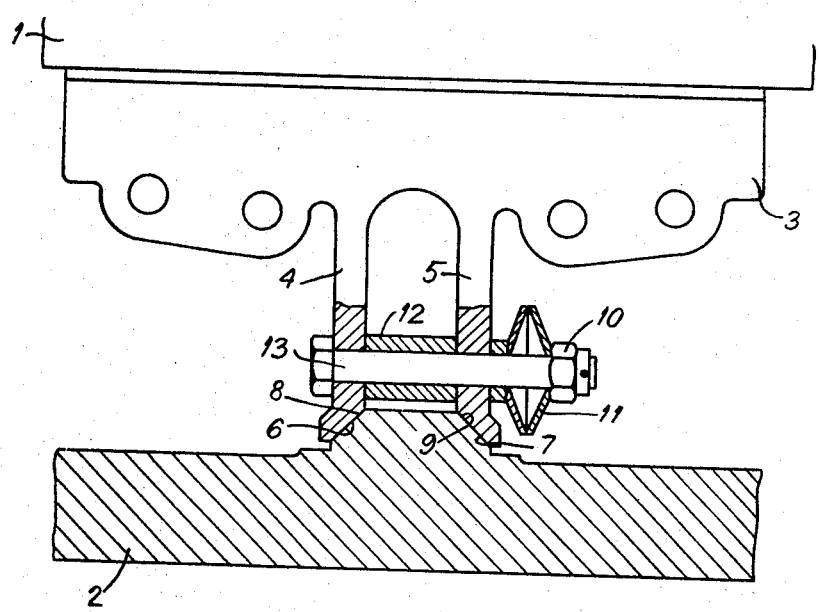
Oscar Hilding Hillander
By Eric G. Munson
Attorney United States Patent Office 3,471,206
Patented Oct. 7, 1969

3,471,206
SHAFT BEARINGS FOR COUNTERROTATING
PROPELLER SHAFTS
Oscar Hilding Hillander, Malmo, Sweden, assignor to
Stal-Laval Turbin AB, Finspong, Sweden
Filed Oct. 25, 1967, Ser. No. 677,983
Claims priority, application Sweden, Nov. 16, 1966,
15,658/66
Int. Cl. F16c 13/00, 39/00, 35/00
U.S. Cl. 308—15                                    6 Claims

ABSTRACT OF THE DISCLOSURE

A bearing arrangement for the journalling of a shaft within an outer surrounding component, such as an inner shaft arranged within an outer tubular shaft and where the shafts are adapted for counterrotating propeller mounting purposes, the bearing device comprising a sleeve forming a bearing or a bearing holder for the journalling of the inner shaft. The sleeve has flexible radial fins provided with tapered support faces resting against tapered faces provided on the interior of the outer shaft. The fins are reinforced to resist separating movement by spring-biased elements and spacing means is provided between the fins to limit the movement of the same toward one another.

The present invention relates to a bearing device for the journalling of a shaft in a pierced component that encompasses the shaft, such as for example, an inner shaft disposed within a tubular outer shaft, and the invention particularly refers to shaft bearings for counterrotating propeller shafts.

In bearing arrangements of the above-mentioned type, it can occur that the bearing will be subjected to changes in radial dimensions due, for example, to the frictional heat generated by shaft rotation. This is the case with, for example, shaft bearings for counterrotating propeller shafts of large dimensions, where the changes in dimension can be of such magnitude as to create the risk that an outer shaft of longitudinally split design might open, with oil leakage as a result.

The purpose of the present invention is to achieve a bearing device of this kind in which the bearing is designed for the automatic compensation of changes in radial dimensions, whereby the risk of difficulties caused thereby is avoided or is at least greatly reduced.

The invention is herein described in conjunction with an arrangement comprising shaft bearings for counterrotating propeller shafts, and in the accompanying drawing, wherein an illustrative embodiment of the invention is disclosed:

FIG. 1 shows a partial section through counterrotating propeller shafts at a shaft bearing, and FIG. 2 shows, in a larger scale, a partial section through a bearing half, the outer shaft and a part of the inner shaft.

At 1 is shown an inner shaft which is shown as being journalled in a bearing 3 which is arranged in, and rigidly connected with a longitudinally split tubular outer shaft 2 in order to rotate with the latter. The shaft bearing 3 comprises a sleeve-shaped bearing body of which the surface nearest to the inner shaft is lined with white metal, for example. The bearing body 3 is provided with two radially projecting fins 4, 5 engaged with the bore of the outer shaft, whereby the bearing is centered relative to the outer shaft 2 and due to friction, is rigidly connected to the outer shaft. The fins 4 and 5 are flexible in the axial direction of the bearing and include two opposed tapered support faces 6 and 7, arranged to rest against two corresponding opposed tapered support faces 8 and 9 on the inner face of the bore of the outer shaft 2. The shaft bearing 3 is split in a known manner, into two halves so as to permit installation of the inner shaft. Fins 4 and 5 are reinforced to resist undue flexing in the axial sense by means of a number of bolts 13 arranged in a circle around the fins and near the circumference of the fins. Said bolts are tensioned by springs acting in the axial direction. The bolts join the fins 4 and 5, a number of spring washers 11 being arranged around the bolts and between a nut 10 and the fin 5. The spring washers provide for controlled pre-tensioning of the bolts 13, whereby a given minimum contact pressure is maintained between the support faces 6, 8 and 7, 9. Each of the bolts 13 carries a spacer sleeve 12 between the fins to control the minimum axial distance between the fins 4 and 5.

The frictional heat generated by shaft rotation would cause an increase or extension of the radial dimension of the bearing but this is prevented until the stresses in the bearing reach a level corresponding to the pre-stressing of the bolts 13. When this limit has been passed the support faces 6 and 7 will slide relatively to the faces 8 and 9, causing bending or flexing of the fins 4 and 5 in an axial sense away from one another. The bearing will, however, retain its central location relative to the outer shaft. When the bearing cools, the fins 4 and 5 will, under the influence of the pressure of the spring washers 11, return to their initial position without affecting the central location of the bearing. The pre-tensioning provided by the springs 11 is selected to be of sufficient magnitude so that the bearing may be subjected to a radial force of a given amount without causing any relative displacement of the support faces 6, 7, 8 and 9. The limiting radial force at which the support faces of the fins will start to slide relative to the support faces of the outer shaft may suitably be selected so that the weight of the shaft itself will not cause any displacement of the support faces.

While I have herein mentioned that the fins 4 and 5 may be arranged on the bearing 3, these fins might be arranged on the inner face of the outer shaft 2 and in such case the parts 6 and 7 would be provided on the bearing 3.

What I claim is:

1. A bearing device for the journalling of an inner shaft, a pierced component constituting a tubular outer shaft that encompasses the inner shaft, the shaft arrangement being especially adapted for counterrotating propeller shafts, the bearing device comprising a sleeve-shaped element forming a bearing or bearing holder for the journalling of the inner shaft relative to the outer shaft, the sleeve-shaped element being provided with two radial fins which are flexible in the axial direction of the sleeve-shaped element and are provided with two opposed support faces; two correspondingly opposed tapered support faces provided within the pierced component and against which the opposed faces of the sleeve-shaped element rest, the fins being reinforced against flexing in the axial direction, reinforcing devices for the fins which resist the flexing of the same and which tend to resist axial separating forces on the fins which might be transmitted through the support faces in the event of radial or axial relative displacement of the shaft and the pierced component.

2. A device according to claim 1, wherein the reinforcing device comprises axially-acting spring devices distributed in a circle.

3. A device according to claim 2, wherein each reinforcing device comprises a bolt extending through the fins and which carries a spacer sleeve between the fins to control the minimum axial distance between the fins, and spring means carried on a part of the bolt between one of the fins and a nut on the bolt.

4. A device according to claim 3, wherein the compression spring consists of a number of spring washers on the bolt and in contact.

5. A device according to claim 1 wherein the sleeve-shaped bearing component forms a shaft bearing or a part thereof for the journalling of the shaft in the pierced component.

6. A bearing device for a pair of concentric, counter-rotating propeller shafts comprising, an inner shaft within an outer shaft, a bearing disposed between said shafts, said bearing encircling the inner shaft, the bearing including a pair of spaced, flexible fins projecting radially from it toward the inner face of the outer shaft and contacting therewith at their marginal edge portions, each of the fins being provided near its periphery with an inclined surface, the interior of the outer shaft being provided with complementary inclined surfaces against which the inclined surfaces on the fins are in contact, spacing means arranged between the fins, bolts extending through the spacing means and through the fins, and spring means carried by the bolts for controlling clamping pressure exerted by the bolts on the fins.

References Cited

UNITED STATES PATENTS 3,390,925   7/1968   Fangman _____ 308—15

MARTIN P. SCHWADRON, Primary Examiner

F. SUSKO, Assistant Examiner